(12) United States Patent
Englander

(10) Patent No.: US 6,796,667 B1
(45) Date of Patent: Sep. 28, 2004

(54) BREAKAWAY BUS MOUNT SYSTEM TO HOLD MIRROR SUPPORTING SHAFT

(75) Inventor: Benjamin Englander, Jamaica, NY (US)

(73) Assignee: Rosco Inc., Jamaica, NY (US)

( * ) Notice: Subject to any disclaimer, the term of this patent is extended or adjusted under 35 U.S.C. 154(b) by 0 days.

(21) Appl. No.: 10/414,551

(22) Filed: Apr. 15, 2003

(51) Int. Cl.$^7$ .............................................. G02B 7/182
(52) U.S. Cl. ...................... 359/871; 359/872; 359/873; 359/874; 359/875; 359/876; 359/879
(58) Field of Search ................................. 359/871–876, 359/879; 248/475.1, 476–478, 488–489

Primary Examiner—Mohammad Sikder

(74) Attorney, Agent, or Firm—Ostrolenk, Faber, Gerb & Soffen, LLP

(57) ABSTRACT

A tripod style mirror mount system for vehicles which secures the main mirror hole in a vehicle mount which is substantially in the shape of a socket subassembly that is secured to the vehicle and in which a spherical ball stud of the mirror pole is received and retained in a manner which allows the mirror to swivel relative to the body of the vehicle without being detached from the vehicle. First and second braces support the main mirror pole and maintain its position and prevent vibration. The terminal ends of the braces are anchored in joints by means of spherical ball studs which snap out when an obstruction is hit. Thereby the mirror assembly prevents being itself damaged or damaging the vehicle body when the mirror assembly inadvertently is struck by an obstacle.

10 Claims, 4 Drawing Sheets

BREAKAWAY BUS MOUNT SYSTEM TO HOLD MIRROR SUPPORTING SHAFT

BACKGROUND OF THE INVENTION

1. Field of the Invention

The present invention relates to a mirror mount system for vehicles and more particularly to a breakaway mount attachable to the body of a vehicle and adapted to securely hold the pole or staff of an automotive mirror which can break away without detaching from the vehicle body.

2. Related Art

Motor vehicles, and in particular larger vehicles such as buses, trucks and the like, require an array of mirrors mounted on exterior surfaces of such vehicles in order to improve the visibility and field of view of the driver in and around the vehicle. Typically, an automotive mirror element has attached to it a staff or pole which is secured within a mount system which is in turn attached to the body of the vehicle.

The present invention concerns itself with the mount per se and specifically with a mount system of the type which can be attached to the body of the vehicle, for example to the fenders.

Single connection point mirror mounts of the above type are described in the present Assignee's previously issued U.S. Pat. No. 5,576,899, the contents of which are incorporated by reference herein.

In addition, mirror mounts for vehicles-have been described in several issued patents, including U.S. Pat. Nos. 2,969,715, 3,592,532, 4,165,156, 4,500,063, 5,316,257 and 5,106,049, the contents of which are incorporated by reference herein.

Tripod style mirror mounts are also known of the type in which a main mirror pole has one end thereof supporting a mirror head and another end rigidly attached to the vehicle. It includes two bracing poles which extend at an angle to the main mirror support pole in well known manner.

The known mirror pole mounting systems suffer from the drawback which ensues from the fact that when the mirror system contacts an obstruction, it is subject to breaking away, damaging not only the mirror system, but the vehicle body to which the mirror system is anchored as well.

SUMMARY OF THE INVENTION

Accordingly, the general objective of the present invention is to provide a substantially improved mirror mount system which can be mounted to various mirror surfaces and which incorporate a breakaway system that protects the vehicle body from being damaged.

It is a further object of the invention to provide a breakaway mirror mount system which is sturdier, less expensive and reliably connectable to a vehicle body.

Yet a further object of the present invention is to provide a mirror mount system with a breakaway capability, but with a provision that retains a connection between the mirror system and the vehicle, even after the mirror system has been partially detached in response to a collision with an obstruction.

Essentially, the cross-view mirror assembly consists of a tripod with a cross-view mirror head attached to it. Three pieces of tubing which comprise the tripod are attached to the vehicle, typically a school bus, via spherical joints. The two forward joints are allowed to "snap out" in the event of the mirror hitting an obstacle (the breakaway feature). The rear joint, which supports the third leg of the tripod, does not disengage, keeping the assembly attached to the vehicle at all times.

The present invention focuses on the joint between the terminal ends of the tripod tubes and the vehicle body.

Other features and advantages of the present invention will become apparent from the following description of the invention which refers to the accompanying drawings.

BRIEF DESCRIPTION OF THE DRAWING

FIG. 5 is a perspective of the breakaway joint for the two support braces of the mount system of FIG. 2a.

DETAILED DESCRIPTION OF THE PREFERRED EMBODIMENTS OF THE INVENTION

Figure 1:
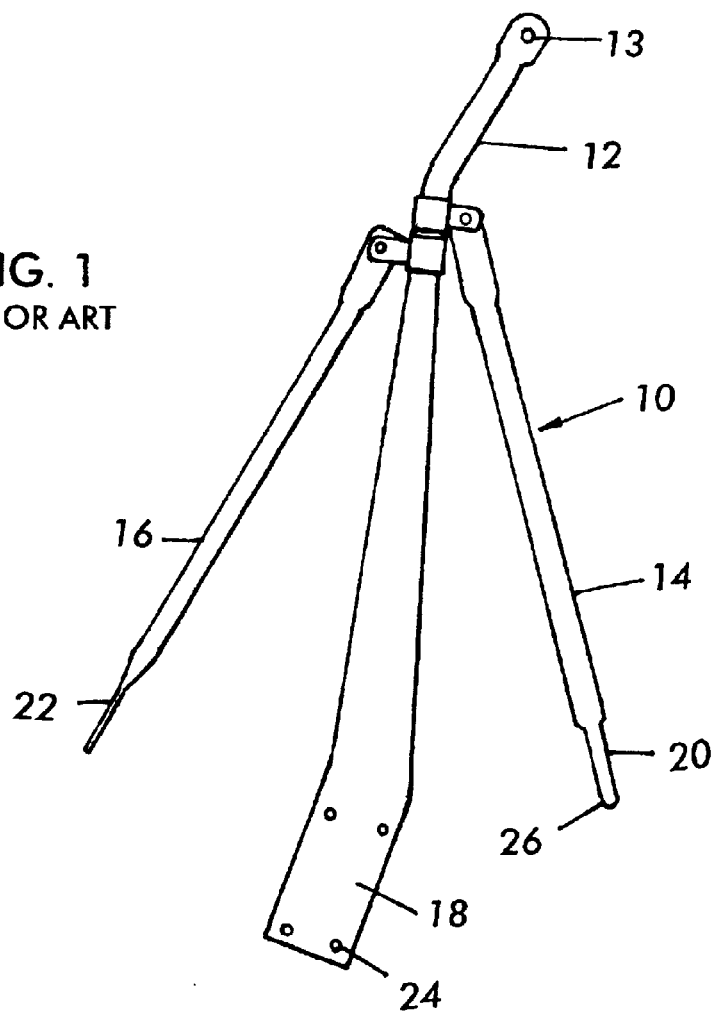
FIG. 1 is a perspective of a prior art tripod system for supporting a mirror head to a vehicle body.

Prior art FIG. 1 illustrates a tripod style mirror mounting system 10 comprising a main support pole 12 having a first distal end 13 to which a mirror is head (not shown) may be attached by means of a swivel ball or a rigid mounting system. The distal end 18 of the main pole 12 has a bent piece that conforms to the surface of a vehicle (not shown) to which it may be attached by four screws 24.

First and second support braces 14 and 16 have respective distal ends 20 and 22 with screw openings 26 and a shape that conforms to the vehicle to which they may be attached in well known manner.

Figure 2:
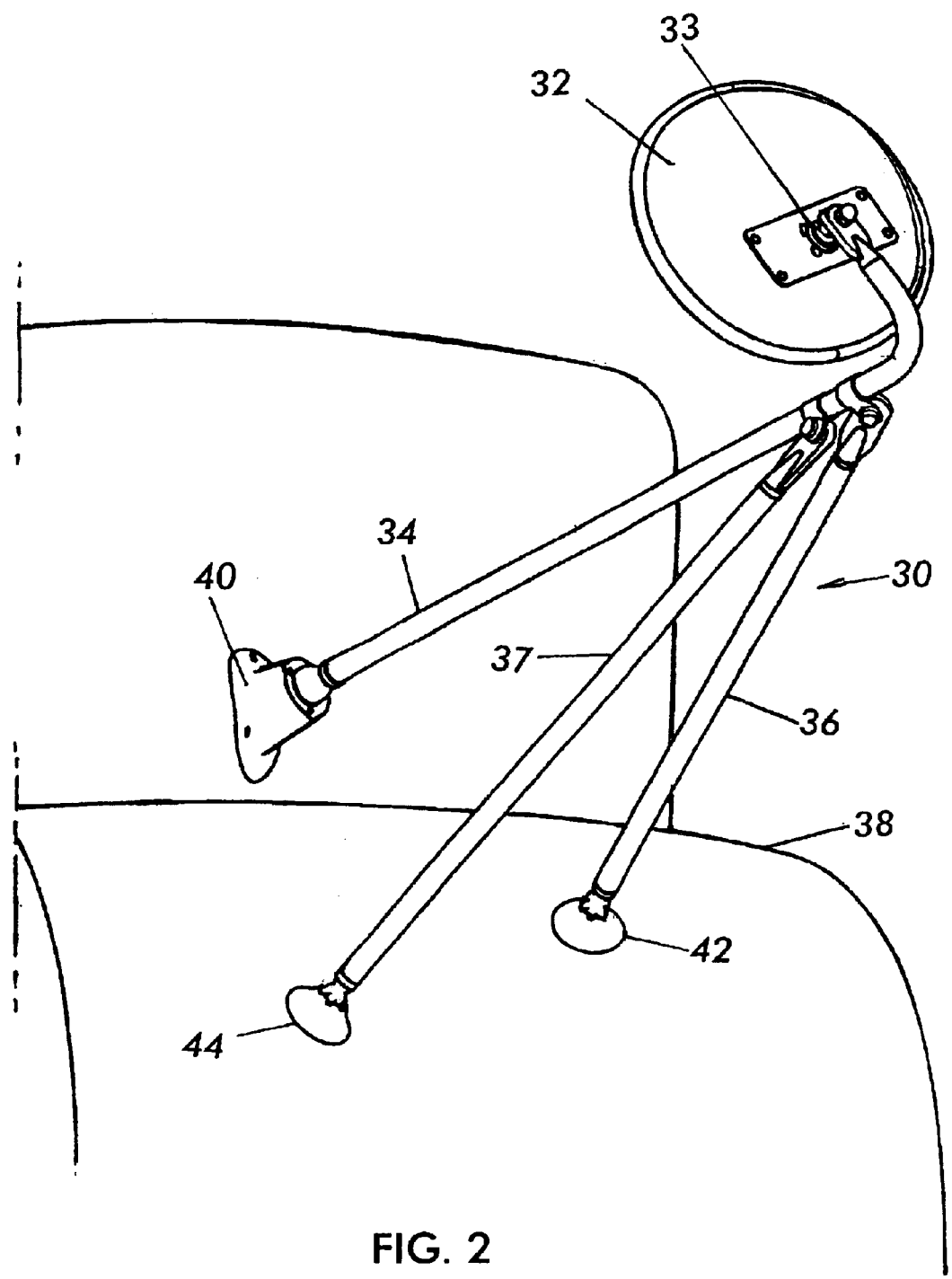
FIG. 2 is a perspective of a tripod style mounting system which includes breakaway joints in accordance with the invention.

With reference to FIG. 2, the novel tripod system of the invention comprises a main pole 34 which is secured by a swivel ball mechanism and socket assembly 40 to the vehicle body 38, supports a mirror head 32 which is connected by a swivel mechanism 33 to the other free end of the main pole 34. A pair of braces 36 and 37 are anchored to the vehicle body 38 by means of joints 42 and 44 which are so constructed that when the assembly 30 encounters an obstruction, the connection of the braces 36 and 37 snaps out of the joints 42 and 44, permitting the mirror head and its main pole 34 to remain connected to the joint 40, by swiveling relative to the vehicle body 38 without being damaged or lost.

Figure 2A:
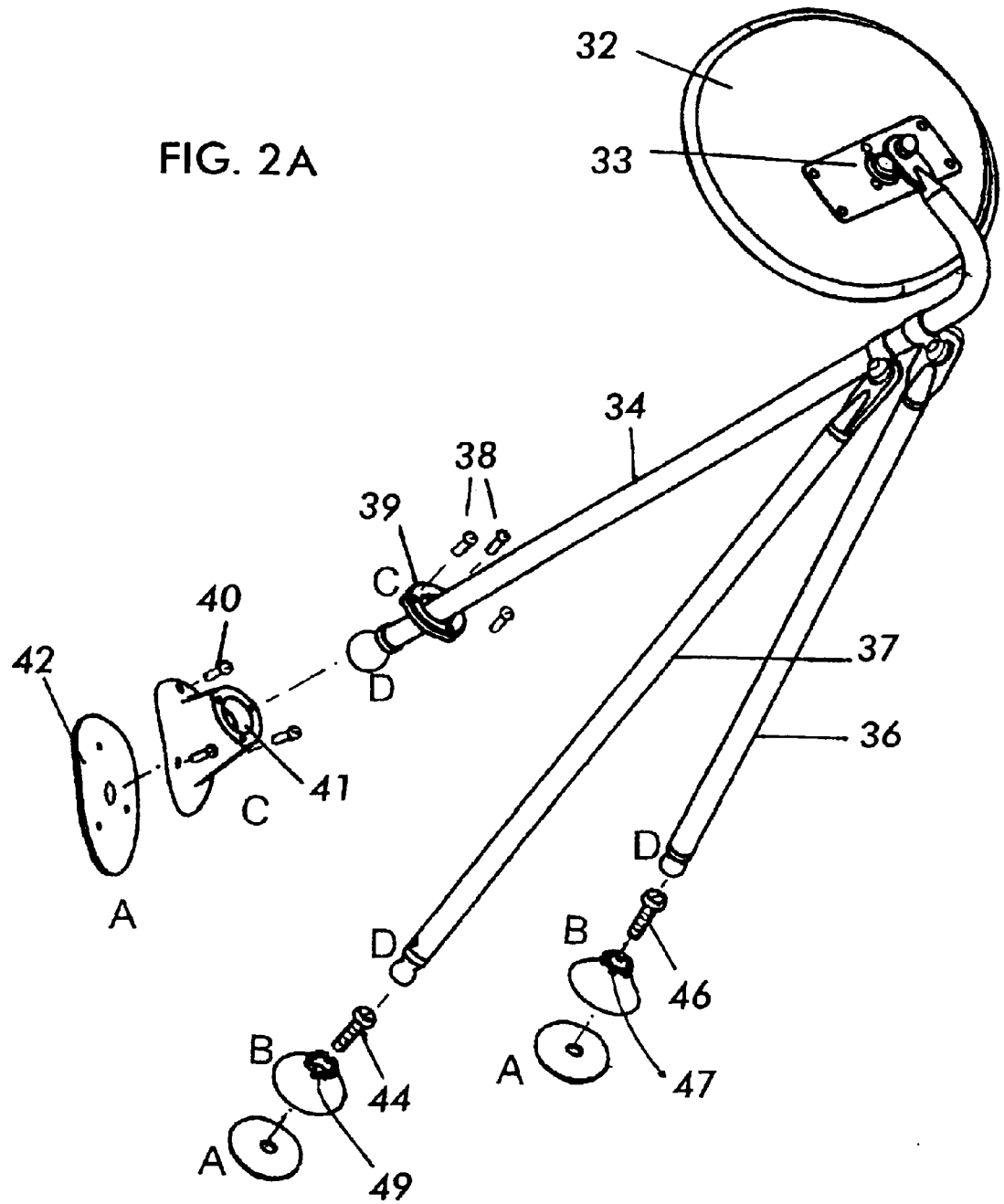
FIG. 2a is a line drawing, partially exploded, of the mounting system of FIG. 2.

The details of the construction of the various joints 40, 42 and 44 are illustrated in FIG. 2a, wherein the reference character A designates a pressure plate with threaded holes that is positionable under the hood or fender body of the vehicle. Reference numeral B indicates a brace ball mounting socket subassembly. Reference numeral C identifies the mirror arm ball mounting socket subassembly. Lastly, the reference numeral D designates a spherical ball-stud.

Figure 3:
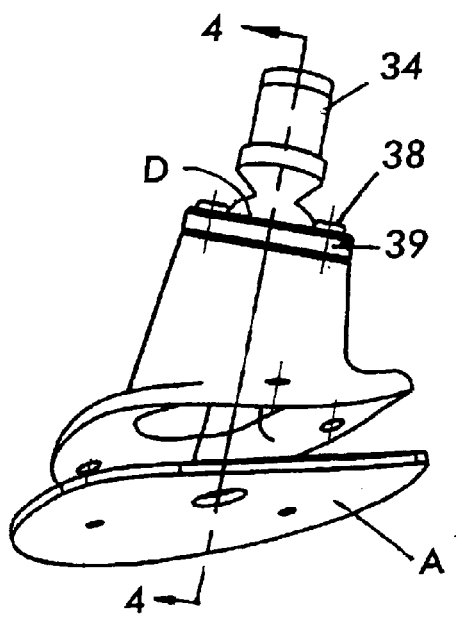
FIG. 3 is a perspective of a non-breakaway swivel joint for the main pole of the mirror head.

The mirror arm 34 is swivably secured to the body 38 of the vehicle by the spherical, ball stud D being received within the ball socket 41 and secured therein by the screws 38 which hold the mirror arm ball mounting plate 39 against the socket 41, as shown in FIG. 3.

Figure 4:
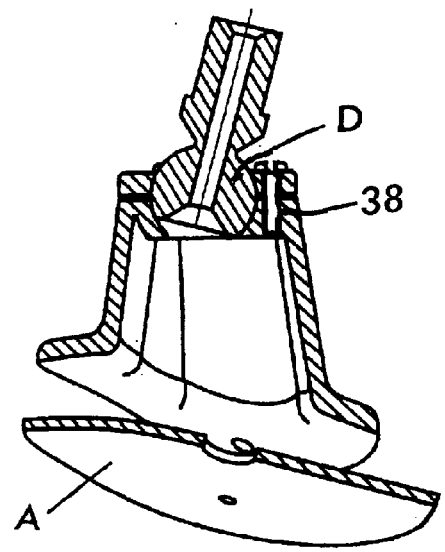
FIG. 4 is a cross-section of FIG. 3 along lines 4—4.

The mirror arm ball mounting socket assembly is itself secured to the body 38 of the vehicle by screws 40, which penetrate the body 38 and thread into holes 42 in the pressure plate A which is contoured to the underside shape of the vehicle body 38. Thus, as seen in the cross-sectional view of FIG. 4, the ball stud D will swivel within the socket 41, but will not be dislodged therefrom, even if the entire assembly is jolted by an obstruction. In other words, the assembly will swivel, not break.

Figure 5:
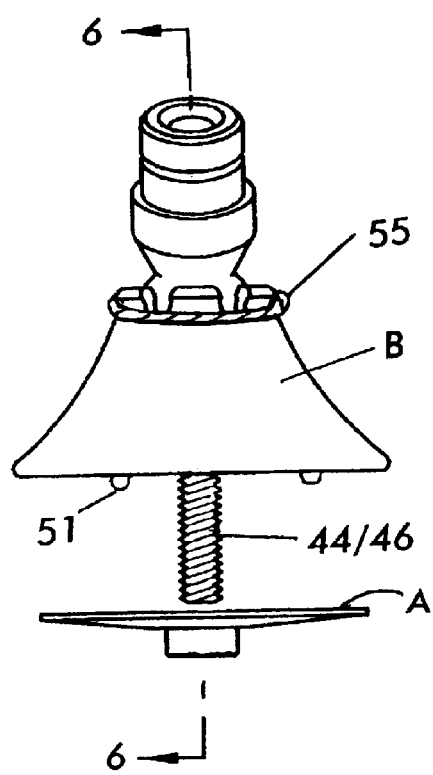
Figure 6:
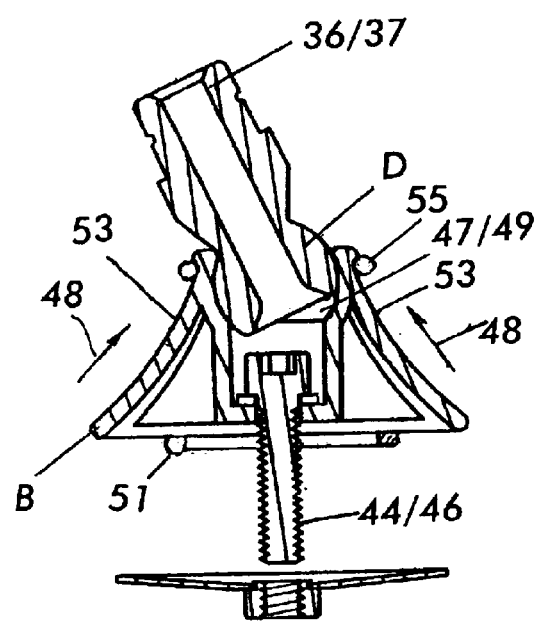
FIG. 6 is a cross-section to lines 6—6 in FIG. 5.

Turning to the brace arms 36 and 37, these braces also have spherical ball studs D which are received (but not secured) within ball sockets 47 and 49, respectively. The screws 46 and 47 secure the brace ball mounting socket subassembly to the vehicle body 38 by being screwed into their respective pressure plate A, as illustrated in FIGS. 5 and 6. These figures show that they lack the retainer plate 39 of FIGS. 3 and 4. Therefore, the brace arms 36 and 37 will slip out of the socket 47/49 when the mirror head 32 or any of the braces 36, 37 or pole 34 is jolted by an obstruction.

Note that the socket ball D for the braces 46/47 need not be spherical. For example, they can be rectangular or have other cross-sectional shapes, as long as they have a shape and structure that allows them to slip out of the holding socket when an obstruction is encountered.

An optional ring-shaped bead or projection 51 may be provided on the underside of the socket assembly B to serve as a fulcrum point or as a locus of points which will cause the inwardly sloping wall 53 to pivot inwardly in the direction of arrows 48, thereby controlling the tightness or the gripping power on the ball stud D within the socket 47/49, by adjusting/turning the screw 44/46.

The gripping power on the ball stud D may be aided by including a circular, split spring ring 55 around the neck of the socket 47/49.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A mirror mount system for mounting a mirror to a vehicle, the mounting system comprising:
   a mirror pole having one end to which a mirror unit assembly is attached and an opposite end comprising a shaped stud;
   a first joint with a receiving socket that receives the stud of the mirror pole;
   at least one brace having a first end which is secured to the mirror pole to brace it and hold it against vibration, the at least one brace having a terminal end with a respective stud;
   a second joint that receives the stud of the at least one brace;
   wherein one of the first and second joints is structured to receive and hold its respective stud in a manner which allows swiveling, but does not allow the respective stud to slip out therefrom, and the other joint having a socket which receives its respective stud in a manner which allows the same to snap out of the other joint when jolted by an obstruction.

2. The mirror mount system of claim 1, in which the first and second studs are spherical ball studs.

3. The mirror mount system of claim 1, in which the at least one brace comprises a first brace and a second brace and each of the first and second braces comprises a respective stud which is received in a respective joint in a manner which allows the studs to snap out of the joints when the mirror assembly is struck by an obstacle.

4. The mirror mount system of claim 3, in which the stud of the mirror pole is received within its respective joint in a manner which allows it to swivel therein without slipping out when an obstruction is encountered.

5. The mirror mount system of claim 4, in which the joint for the mirror pole comprises a mirror pole socket subassembly, including a retaining plate and a ball stud socket.

6. The mirror mount system of claim 3, including a respective pressure plate with a threaded hole therein for mounting on an underside of a vehicle body for securing the respective joint thereto.

7. The mirror mount system of claim 3, in which the first and second joints have frusto conical shapes.

8. The mirror mount system of claim 1, in which the stud of the at least one brace is non-spherical.

9. The mirror mount system of claim 1, including a projection which depends from an underside of the second joint and which serves as a fulcrum point that allows adjusting the holding force exerted on the stud of the at least one brace.

10. The mirror mount system of claim 1, including a spring ring attached at a neck portion of the socket of the other joint.

* * * * *